US012571779B2

(12) United States Patent
Kanazawa et al.

(10) Patent No.: US 12,571,779 B2
(45) Date of Patent: Mar. 10, 2026

(54) METHOD FOR CREATING DISCRIMINATOR

(71) Applicant: Shimadzu Corporation, Kyoto (JP)

(72) Inventors: Shinji Kanazawa, Kyoto (JP);
Yoshihiro Hayakawa, Kyoto (JP)

(73) Assignee: SHIMADZU CORPORATION, Kyoto
(JP)

( * ) Notice: Subject to any disclaimer, the term of this
patent is extended or adjusted under 35
U.S.C. 154(b) by 1222 days.

(21) Appl. No.: 17/218,861

(22) PCT Filed: Oct. 2, 2018

(86) PCT No.: PCT/JP2018/036801
§ 371 (c)(1),
(2) Date: Dec. 17, 2021

(87) PCT Pub. No.: WO2020/070786
PCT Pub. Date: Apr. 9, 2020

(65) Prior Publication Data
US 2022/0128532 A1 Apr. 28, 2022

(51) Int. Cl.
*G06F 11/30* (2006.01)
*G01N 30/86* (2006.01)
(52) U.S. Cl.
CPC ..... *G01N 30/8631* (2013.01); *G01N 30/8644*
(2013.01); *G01N 30/8651* (2013.01); *G01N*
*2030/8648* (2013.01)
(58) Field of Classification Search
CPC .................................................. G01N 30/8631
See application file for complete search history.

(56) References Cited

FOREIGN PATENT DOCUMENTS

| JP | 1994-094696 | | 4/1994 |
|----|-------------|---|--------|
| JP | H0694696 | * | 8/1994 |
| JP | 2017-096853 A | | 6/2017 |

OTHER PUBLICATIONS

Bogomolov et al., "Peak Matching Algorithm for Chromatographic
Method Optimization," web page document URL <http://www.
acdlabs.com/download/publ/2004/htc8_peak_matching.pdf> (appears
to have expired), searched on Mar. 7, 2018.

(Continued)

*Primary Examiner* — Phuong Huynh
(74) *Attorney, Agent, or Firm* — Muir Patent Law, PLLC

(57) ABSTRACT

An object is to accurately detect peaks of various compo-
sitions, even in a case of unseparated peaks in which peaks
of a plurality of compositions are superimposed. A computer
acquires waveform data D1 having a peak P1 in a compo-
sition A measured by a data analysis device (S10). Next, the
computer acquires waveform data D2 having a peak P2 in a
composition B measured by the data analysis device (S20).
Next, waveform data D12 including unseparated peaks by
superimposing the waveform data D1 including the acquired
peak P1 and the waveform data D2 including the acquired
peak P2 (S30) is generated. Next, the generated waveform
data D12 of the unseparated peaks is input as learning data,
and the waveform data D1 and D2 corresponding to the
waveform data D12 are input as training data in Step S40.
Next, machine learning is performed using the waveform
data D12, D1, and D2, and a learned model for estimating
an accurate separation method of unseparated peaks is
constructed based on the trained result (S50).

5 Claims, 5 Drawing Sheets

1

(56)            References Cited

OTHER PUBLICATIONS

Du et al., "Improved peak detection in mass spectrum by incorporating continuous wavelet transform-based pattern matching", vol. 22 No. 17, 2006, pp. 2059-2065.
Office Action issued in the corresponding CN application No. 2018800998387 on Jun. 22, 2023.
Office Action issued in the corresponding JP application No. 2020-550973 on Oct. 7, 2021.

* cited by examiner

```
          ┌─────────────────────────────────┐
          │             Start               │
          └─────────────────────────────────┘
                          │
                          ▼
┌───────────────────────────────────────────────┐
│ Acquire waveform data D1 including the peak P1 of│ ── S10
│            the composition A                     │
└───────────────────────────────────────────────┘
                          │
                          ▼
┌───────────────────────────────────────────────┐
│ Acquire waveform data D2 including the peak P2 of│ ── S20
│            the composition B                     │
└───────────────────────────────────────────────┘
                          │
                          ▼
┌───────────────────────────────────────────────┐
│ Generate the waveform data D12 of the unseparated peaks│ ── S30
│   by superimposing the peak P1 and the peak P2  │
└───────────────────────────────────────────────┘
                          │
                          ▼
┌───────────────────────────────────────────────┐
│  Input the waveform data D12 as learning data   │
│  Input the peak P1, P2 as the training data     │ ── S40
│             waveform data D12                   │
└───────────────────────────────────────────────┘
                          │
                          ▼
┌───────────────────────────────────────────────┐
│             Machine learning                    │ ── S50
└───────────────────────────────────────────────┘
                          │
                          ▼
          ┌─────────────────────────────────┐
          │              End                │
          └─────────────────────────────────┘
```

FIG. 5A

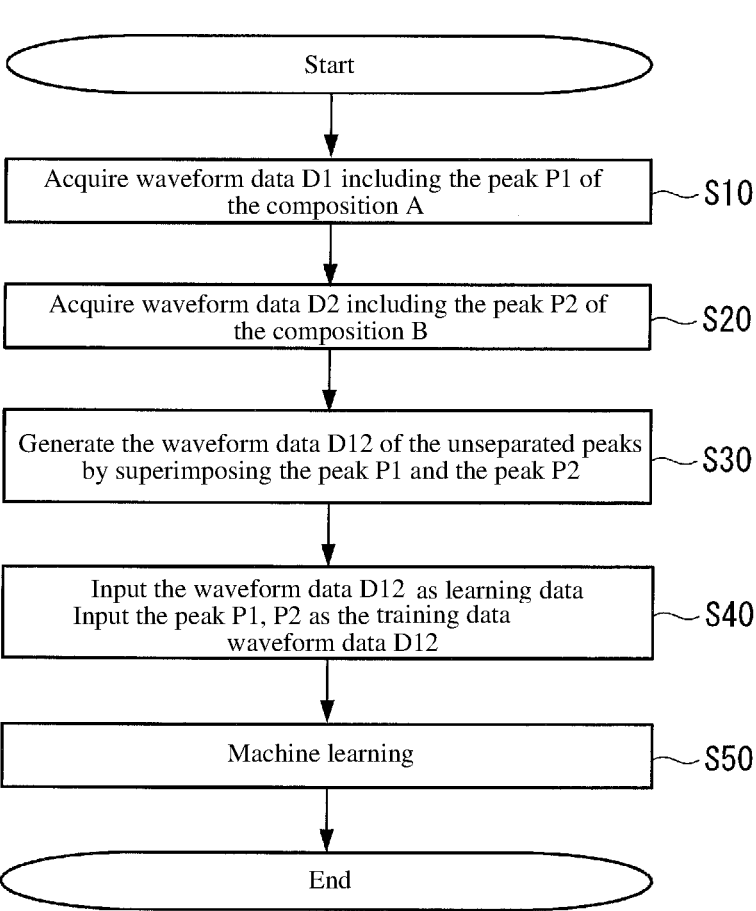

METHOD FOR CREATING DISCRIMINATOR

TECHNICAL FIELD

The present invention relates to a method for generating a discriminator.

BACKGROUND OF THE INVENTION

In a gas chromatograph and a liquid chromatograph, a sample containing various compositions is introduced into a column, and the various compositions are temporally separated in the process of the sample passing through the column to be detected by a detector provided at the outlet of the column. Peaks corresponding to the compositions in the sample appear in the chromatogram acquired by the detector. Since the time (retention time) at which the peak is observed corresponds to the type of the composition, it is possible to specify the composition from the retention time of the peak, i.e., to perform the qualitative analysis. Further, since the height and the area of the peak corresponds to the concentration and the content of the composition, respectively, it is possible to determine the concentration or the content of the composition from the height value of the peak or the area value of the peak, i.e., to perform the quantitative analysis.

The qualitative analysis or quantitative analysis requires a peak detection (including the determination of the positions of the start point and the end point of the peak, and the determination of the intensity at the peak position) on the chromatogram waveform. In a real chromatogram waveform, unseparated peaks may sometimes be detected due to the peaks derived from a plurality of compositions.

Conventionally, various algorithms have been proposed and put into practical use as peak detecting methods based on chromatogram waveforms. For example, a method for detecting peaks using a continuous wavelet transformation has been proposed (see Non-Patent Document 1).

PRIOR ART DOCUMENT

Non-Patent Document

Non-Patent Document 1: Pan Du, Warren A. Kibbe and Simon M. Lin, "Improved peak detection in mass spectrum by incorporating continuous wavelet transform-based pattern matching", Oxford University Press, 2006, Vol. 22, No. 17, p. 2059-2065

SUMMARY OF THE INVENTION

Problems to be Solved by the Invention

However, in a conventional peak detection method, an operator is required to set detection parameters. Therefore, depending on the skills of the operator, the peak detection cannot be performed accurately, or the peak detection requires excessive trials and errors, which is time-consuming.

Accordingly, in order to solve the above-described problems, it is an object of the present invention to provide a method for generating a discriminator capable of accurately performing peak detection of various compositions even in unseparated peaks in which peaks of various compositions are superimposed.

Means for Solving the Problem

An exemplified method of generating a discriminator of the present invention is a method of generating a discriminator for detecting peaks, includes the steps of:

acquiring first waveform data having a first peak;

acquiring second waveform data having a second peak, the second peak being different from the first peak in a peak position;

generating unseparated waveform data by superimposing the first peak of the first waveform data and the second peak of the second waveform data; and performing learning by inputting training data including the unseparated waveform data to the discriminator.

In the present invention, the peak detection includes, for example, the detection of the peak position, the detection of the peak start point and end point, the detection of the peak intensity, and the detection of the area.

Effects of the Invention

According to the present invention, since the peaks of various compositions acquired by measurement are superimposed to generate the learning data of the unseparated peaks, each peak before generating the unseparated peaks can be used as training data. As a result, the accuracy of the machine learning can be improved, and therefore the peaks of various compositions of a sample of a measurement target can be accurately detected.

BRIEF DESCRIPTION OF THE DRAWINGS

FIG. 4 is a flowchart showing an operation of a computer performing machine learning to determine the optimal separation method of unseparated peaks according to an embodiment.

FIG. 5A is a diagram for explaining a learning method of unseparated peaks according to this embodiment.

EMBODIMENTS FOR CARRYING OUT THE INVENTION

Preferred embodiments of the present invention will be described in detail with reference to the attached drawings.

<Configuration Example of Data Analysis Device 1>

Figure 1:
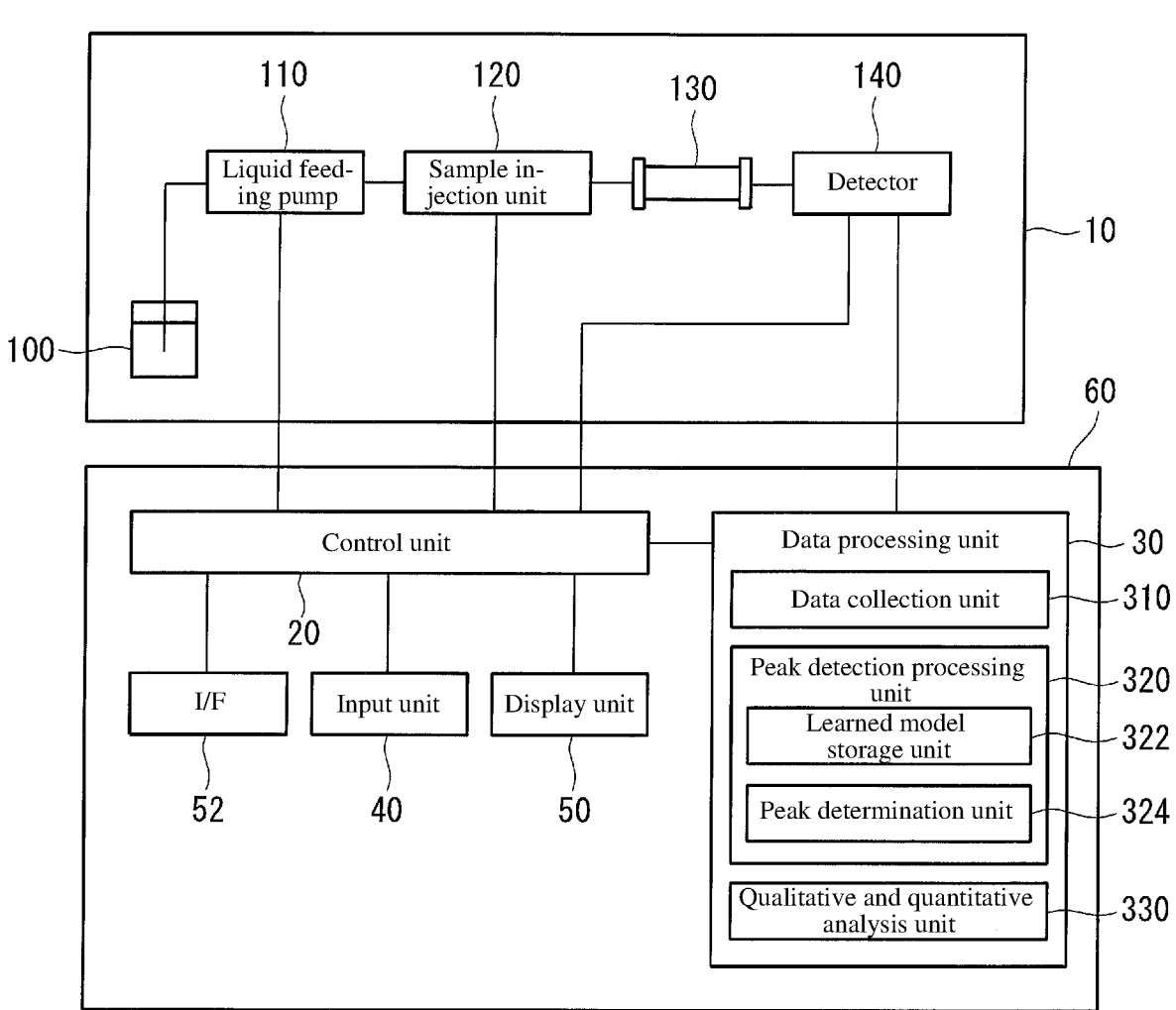
FIG. 1 is a block diagram showing a functional configuration of a data analysis device.

First, a data analysis device 1 for detecting peaks of various compositions contained in a sample will be described. In this embodiment, an example in which, for example, a liquid chromatograph is employed as a data analysis device 1 will be described. FIG. 1 is a block diagram showing an example of the functional configuration of the data analysis device 1.

As shown in FIG. 1, the data analysis device 1 is provided with a measurement device 10 and an arithmetic unit 60. The measurement device 10 includes a mobile phase container 100, a liquid feeding pump 110, a sample injection unit 120, a column 130, and a detector 140.

The mobile phase container 100 is a container for storing a mobile phase. The liquid feeding pump 110 sucks the mobile phase stored in the mobile phase container 100 and delivers it at a constant flow rate. The sample injection unit 120 selects one liquid sample from a plurality of liquid samples, such as, e.g., a standard sample and an unknown sample, and injects the selected liquid sample into the mobile phase delivered from the liquid feeding pump 110. Note that that, if required, a pretreatment, such as, e.g., dilution and concentration, can be performed on the sample, and then the sample after the pretreatment may be injected into the mobile phase.

The column 130 temporally separates the compositions contained in this sample while the sample injected into the mobile phase passes. The detector 140 is, for example, a detector using a spectrophotometer, and converts the compositions of the sample separated by the column 130 into waveform data (which may be referred to as "spectrum") of an electric signal and outputs the signal to the data processing unit 30. Note that in this embodiment, the waveform data includes two-dimensional data in which a second variable (e.g., the intensity of the vertical axis) with respect to a first variable (e.g., the frequency of the horizontal axis) is plotted or three-dimensional data in which a third variable (e.g., wavelength, mass number) is added in addition of the first variable and the second variable. Further, the peak of the waveform data means that the value of the second variable takes maxima or a maximum value with respect to a peak position as a predetermined value of a first variable. The peak has a predetermined width (peak width), and means that the peak width extends symmetrically or asymmetrically with respect to a peak position which is a peak center of the first variable.

The arithmetic unit 60 includes a control unit 20, a data processing unit 30, an input unit 40, a display unit 50, and an interface 52.

The liquid feeding pump 110, the sample injection unit 120, the detector 140, the data processing unit 30, the input unit 40, the display unit 50, and the interface 52 are connected to the control unit 20. The control unit 70 includes, for example, a CPU (Central Processing Unit) and controls the operation of the entire device by executing a program stored in a memory, such as, e.g., a ROM (Read Only Memory), a program of the data processing unit 30, or the like.

The data processing unit 30 is connected to each of the control unit 20 and the detector 140 and is embodied by the control unit 20 and a program. The data processing unit 30 includes a data collection unit 310, a peak detection processing unit 320, and a qualitative and quantitative analysis unit 330.

The data collection unit 310 collects waveform data of a chromatogram based on various compositions of the sample measured by the measurement device 10 and stores the collected waveform data.

The peak detection processing unit 320 has, as functional blocks, a learned model storage unit 322 and a peak determination unit 324. The learned model generated by a computer described later is stored in the memory of the data processing unit 30 and functions as the learned model storage unit 322. Here, the learned model is a model obtained by machine learning the discriminator described later with training data. For example, in a case where unseparated peaks are included in the waveform data measured by the measurement device 10, the peak determination unit 324 automatically separates the unseparated peaks into a plurality of peaks, using the learned models stored in the learned model storage unit 322. With this, the separated peaks corresponding to various compositions can be detected.

Based on the peak information given from the peak detection processing unit 320, the qualitative and quantitative analysis unit 330 identifies the composition corresponding to each peak, calculates the peak height and the peak area value, and calculates the concentration or the content of each composition from the value.

In general, the data processing unit 30 is a computer system including a personal computer on which a predetermined software is installed, a higher-performance workstation, or a high-performance computer connected to the above-described computers via a communication line. That is, the function of each block included in the data processing unit 30 is performed by executing the software installed on the computer system including a single computer or a plurality of computers.

The input unit 40 is composed of, for example, a keyboard, a mouse, a touch panel, and the like, and is configured to perform various operations of the measurement device 10 and perform operations of, e.g., a waveform data analysis of the chromatogram supplied from the measurement device 10. The display unit 50 is, for example, a monitor composed of a liquid crystal display or the like and displays, for example, the waveform data of various compositions detected by the detector 140 and displays the qualitative and quantitative analytical results.

The interface 52 is composed of an LAN (Local Area Network), a WAN (Wide Area Network), a USB (Universal Serial Bus), and the like, and is configured to perform bidirectional communication with the computer 2, which will be described later, for example, to receive the learned model generated by the computer 2.

<Configuration Example of Computer 2>

Figure 2:
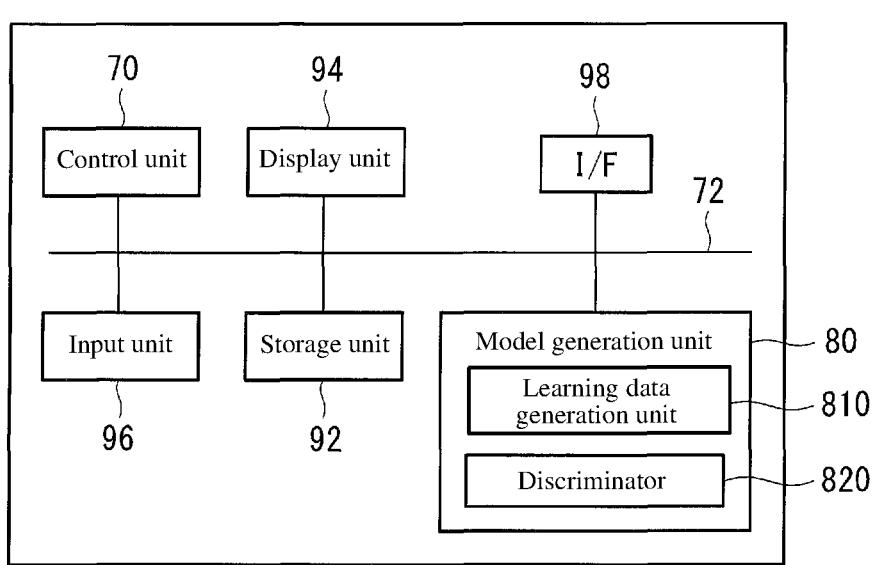
FIG. 2 is a block diagram showing a functional configuration of a computer.

Next, the computer 2 for performing machine learning based on the input learning data is described. FIG. 2 is a block diagram showing an example of the functional configuration of the computer 2.

As shown in FIG. 2, the computer 2 includes a control unit 70, a model generation unit 80, a storage unit 92, a display unit 94, an input unit 96, and an interface 98. The control unit 70, the model generation unit 80, the storage unit 92, the display unit 94, the input unit 96, and the interface 98 are connected to each other via a bus 72.

The control unit 70 includes, for example, a CPU, controls the operation of the entire device by executing the program stored in a memory, such as, e.g., a ROM, a program of the model generation unit 80, and the like, and performs machine learning for estimating a method for separating unseparated peaks.

The model generation unit 80 constructs a learned model for determining the optimal method for separating, for example, unseparated peaks in which a plurality of peaks is superimposed. The model generation unit 80 has, as functional blocks, a learning data generation unit 810 and a discriminator 820. Note that the model generation unit 80 may be stored in the storage unit 92.

The learning data generation unit 810 generates learning waveform data including unseparated peaks in which a plurality of peaks is superimposed, using the waveform data of the chromatogram of each sample measured by the data analysis device 1. Further, the learning data generation unit 810 associates the waveform data of each peak before superimposing the unseparated peaks with the waveform data including the generated unseparated peaks as training data. For the training data, for example, the area value or the height value of each peak of the waveform data may be used. Further, the learning data generation unit 810 acquires various separated waveform data other than the unseparated peaks, taking into account that waveform data of the unseparated peaks is not included in the sample measured by the data analysis device 1.

In the above-described embodiment, the waveform data D12 of the unseparated peaks is generated by the learning data generation unit 810 of the computer 2, and the generated waveform data D12 is put into the discriminator 820 to perform machine learning, but the present invention is not limited thereto. For example, the waveform data D12 including the unseparated peaks may be generated from the acquired waveform data D1 and D2 by a device different from the computer 2, and the generated waveform data D12 may be input to the discriminator 820 of the computer 2.

In this embodiment, an example will be shown in which the waveform data of the sample used in machine learning is acquired using the measurement device 10 of the data analysis device 1 shown in FIG. 1 for convenience, but the waveform data of the sample for machine learning may also be acquired using another measurement device having a function equivalent to that of the measurement device 10.

The discriminator 820 performs machine learning using the learning data containing the waveform data of the unseparated peaks generated by the learning data generation unit 810 and the waveform data of each peak before generating the unseparated peaks, and generates a learned model for determining the optimal separation method in the unseparated peaks. In this embodiment, since the training data of each peak constituting the unseparated peaks is assigned to the unseparated peaks, the accuracy of the machine learning can be improved. Further, the discriminator 820 performs machine learning by capturing waveform data other than the unseparated peaks and includes the function that can accurately detect a peak other than the unseparated peaks in the learned model. As the machine learning method of the discriminator 820, for example, a neural network, an SVM (Support Vector Machine), or a known algorithm such as an AdaBoost can be used.

The storage unit 92 is composed of a non-volatile storage device, such as, e.g., a ROM (Read only Memory), a flash memory, an EPROM (Erasable Programmable ROM), an HDD (Hard Disc Drive), an SSD (Solid State Drive), or the like. The storage unit 92 stores, for example, an OS (Operating System).

The display unit 94 is, for example, a monitor configured by a liquid crystal display or the like. The input unit 96 is configured by, for example, a keyboard, a mouse, a touch panel, and the like, and performs various operations related to the implementation of machine learning.

The interface 98 is configured by an LAN, a WAN, a USB, and the like, and is configured to, for example, perform bidirectional communication with the data analysis device 1, receive the waveform data of the chromatogram from the data analysis device 1, and transmit the generated learned model to the data analysis device 1.

<Machine Learning Method>

Next, a mechanical data analysis device for constructing a learned model for accurately separating peaks of various compositions using a discriminator 820 in a case where the chromatogram of the sample measured by the data analysis device 1 is unseparated peaks in which a plurality of peaks is superimposed will be described. Hereinafter, a conventional machine learning method will be described. Then, the machine learning method of this embodiment will be described. Further, as a sample to be separated and detected by the data analysis device 1, for example, a sample containing compositions A and B is used.

[Conventional Machine Learning Method For Unseparated Peaks]

Figure 3A:
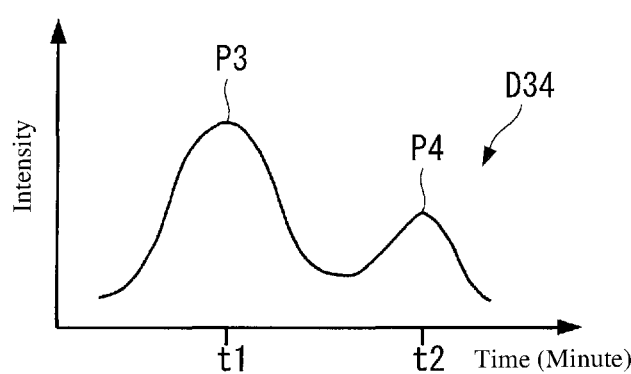
FIG. 3A is a diagram for explaining a learning method of unseparated peaks in a conventional art.

First, the sample including compositions A and B is separated and detected by the data analysis device 1, and the waveform data D34 including unseparated peaks in which the peak P3 of the composition A and the peak P4 of the composition B are superimposed is acquired. FIG. 3A shows an example of the waveform data D34. As shown in FIG. 3A, the waveform data D34 has the peak P3 of the composition A at the retention time t1 and the peak P4 of the composition B at the retention time t2. The acquired waveform data D34 is input to the discriminator 820 as learning data.

Here, in the case of performing machine learning by the waveform data D34 to be input, in order to accurately separate the peak P3 of the composition A and the peak P4 of the composition B in the unseparated peaks, it is required to prepare training data corresponding to the waveform data D34. As the training data, for example, waveform data D3 containing the peak P3 and waveform data D4 containing the peak P4 acquired by separating the unseparated peaks by the operator can be used. Since the area value of each of the separated peaks P3 and P4 can be known in advance, the peak P3 and the peak P4 can be separated from the input unseparated peaks in the waveform data D34. It should be noted that the separation operation of the unseparated peaks can also be performed automatically by an algorithm by a computer.

Figure 3B:
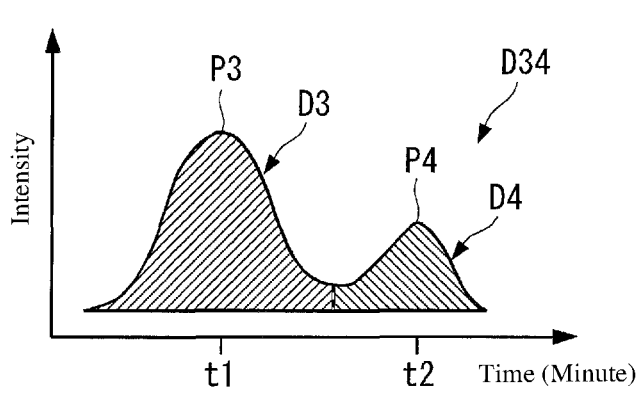
FIG. 3B is a diagram for explaining a learning method of unseparated peaks in a conventional art.

As a method of separating unseparated peaks, there is the following method. FIG. 3B shows a vertical division method. As shown in FIG. 3B, in the vertical division method, the peak P3 and the peak P4 are separated by a perpendicular line drawn vertically on the baseline from the point where the amplitude between the peak P3 and the peak P4 in the waveform data D34 is minimized (hereinafter, referred to as the "boundary point") to acquire waveform data D3 and waveform data D4.

Figure 3C:
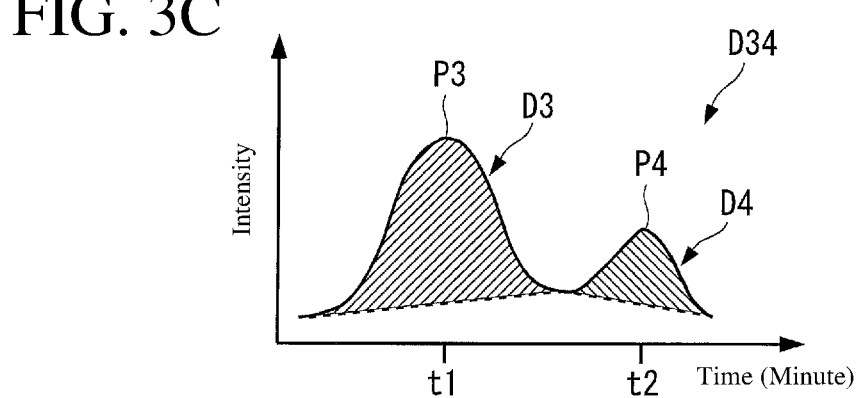
FIG. 3C is a diagram for explaining a learning method of unseparated peaks in a conventional art.

FIG. 3C shows a first baseline division method. As shown in FIG. 3C, in the first baseline division method, the peak P3 and the peak P4 are separated by drawing a baseline between the start point of the peak P3 and the boundary point, and a baseline between the boundary point and the end point of the peak P4, thereby acquiring waveform data D3 and waveform data D4.

Figure 3D:
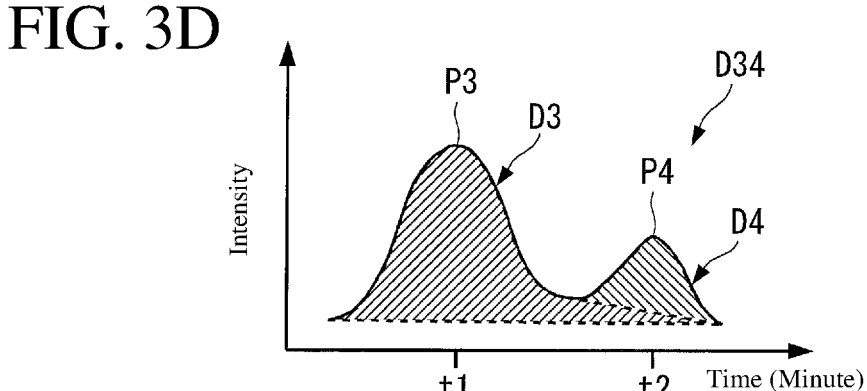
FIG. 3D is a diagram for explaining a learning method of unseparated peaks in a conventional art.

FIG. 3D shows a second baseline division method that differs from FIG. 3C. As shown in FIG. 3D, in the second baseline division method, the peak P3 and the peak P4 are separated by drawing a baseline between the start point in the peak P3 and the end point of the peak P4 and drawing a baseline between the border point and the end point of the peak P4, thereby acquiring waveform data D3 and waveform data D4.

Each of the waveform data D3 including the peak P3 and the waveform data D4 including the peak P4 acquired by each division method described above are input to the discriminator as training data. The discriminator performs machine learning using the waveform data D34 of the unseparated peaks, the waveform data D3 and the waveform data D4 as the training data corresponding to the waveform data D34, so as to construct a learned model for accurately separating the unseparated peaks into each peak.

However, in the above-described method of separating unseparated peaks, there is the following problem. That is, there is a problem that the area value or the height value of each peak after the separation differs depending on the type of the division method. Therefore, the training data of each of the peaks P3 and P4 also varies depending on the type of the separation method to be employed, and therefore it is impossible to perform highly accurate machine learning. Consequently, there has been a problem that the peak of each of various compositions in a predetermined sample cannot be accurately detected. Therefore, the machine learning method of this embodiment described below solves the above-described problems in the conventional art.

[Machine Learning Method of Unseparated Peaks In The Present Invention]

Figure 5B:
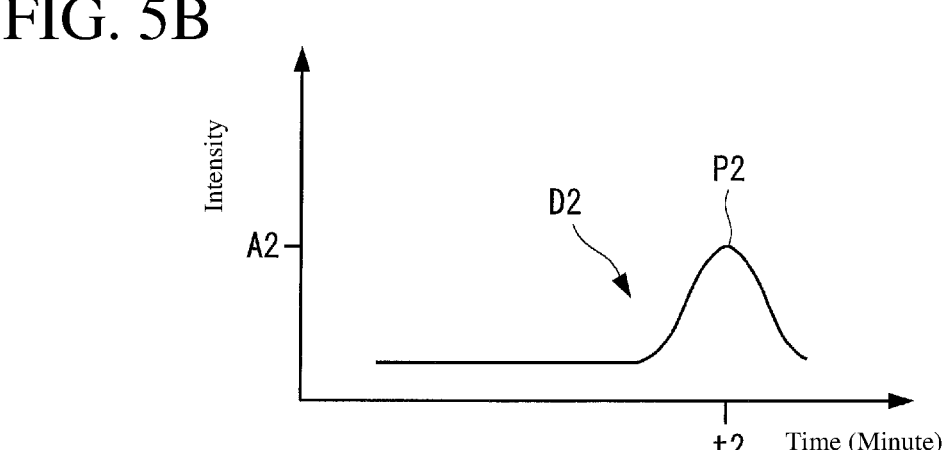
FIG. 5B is a diagram for explaining a learning method of unseparated peaks according to this embodiment.
Figure 5C:
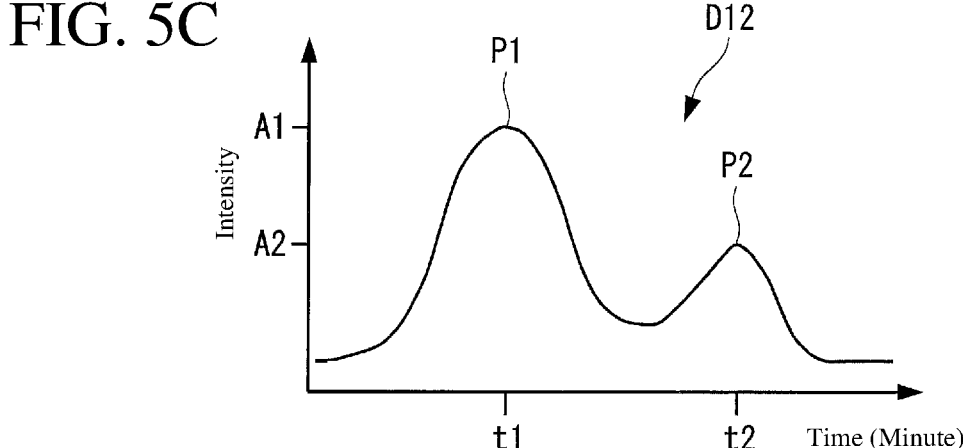
FIG. 5C is a diagram for explaining a learning method of unseparated peaks according to this embodiment.

FIG. 4 is a flowchart showing an example of a machine learning method for constructing a discriminator 820 for separating the unseparated peaks of the compositions A and B according to this embodiment. FIG. 5A shows an example of the waveform data D1 of the composition A. FIG. 5B shows an example of the waveform data D2 of the composition B. FIG. 5C shows an example of the waveform data D12. The computer 2 executes the operation shown in FIG. 4 by executing the program of the model generation unit 80.

In Step S10, the input unit 96 of the computer 2 receives the input of the waveform data D1 of the composition A measured by the data analysis device 1 shown, for example, in FIG. 1. As shown in FIG. 5A, in the waveform data D1, the peak P1 of the amplitude A1 corresponding to the composition A appears at the retention time t1.

In Step S20, the input unit 96 of the computer 2 receives the input of the waveform data D2 of the composition B by the data analysis device 1. As shown in FIG. 5B, in the waveform data D2, the peak P2 of the amplitude A2 corresponding to the composition B appears at the retention time t2. Note that the retention time t2 is a time later than the retention time t1, and the peak P2 and the peak P1 have different peak positions. The amplitude A1 is greater than the amplitude A2.

In Step S30, the learning data generation unit 810 of the computer 2 generates waveform data D12 including unseparated peaks by superimposing the waveform data D1 and the waveform data D2, which are time-series signals taken from the input unit 96. That is, it intentionally generates the waveform data D12 in which the peak P1 and the peak P2 are not separated. As shown in FIG. 5C, the waveform data D12 has the peak P1 at the retention time t1 and the peak P2 at the retention time t2, and the end point of the peak P1 and the start point of the peak P2, which adjoin each other, are not separated from each other.

In Step S40, the discriminator 820 of the computer 2 acquires the waveform data D12 of the generated unseparated peaks as learning data, and acquires the waveform data D1 and D2 corresponding to the waveform data D12 as training data. As described above, the area value of each peak P1, P2 is used as the training data.

In Step S50, the discriminator 820 of the computer 2 performs machine learning using the waveform data D1, D2 which is the acquired waveform data D12 and training data, and constructs a learned model for estimating an accurate separation method (separation position) of the unseparated peaks based on the learned result. The learned model generated by such a learning method is stored in a memory, such as, e.g., the storage unit 92 of the computer 2.

Further, the learned model is transmitted to the data analysis device 1 shown in FIG. 1 via a communication line and stored in the learned model storage unit 322. In the data analysis device 1, in a case where unseparated peaks are detected at the time of the peak detection of a given sample, the waveform data of the unseparated peaks is separated into peaks for each composition by using the learned model of the learned model storage unit 322. By using the learned model that has implemented the machine learning for unseparated peaks, it is possible, for example, to calculate at which position of the unseparated peaks the division is optimal, so that the unseparated peaks can be accurately separated into peaks corresponding to various compositions.

As described above, according to this embodiment, since the learning data of the unseparated peaks is generated by superimposing the peak of each composition measured independently in advance, each peak before generating the unseparated peaks can be used as training data, and therefore the accuracy of machine learning can be improved. Thus, since the separation of the unseparated peaks can be performed using machine learning improved in accuracy, the peaks of various compositions of the sample serving as a measurement target can be accurately detected. Further, according to this embodiment, even in a case where it is difficult to acquire a large number of learning data, since learning data can be generated by superimposing a plurality of peaks, it is possible to enlarge learning data, which in turn can further improve the accuracy of the machine learning.

In this embodiment, each peak P1, P2 before generating unseparated peaks is input to the discriminator 821 as training data in association with the waveform data D12 of the unseparated peaks generated by superimposing the two peaks P1 and P2 measured individually. Since the peaks P1 and P2 are independently detected by the data analysis device 1, the accurate area value of each peak P1 and P2 can be acquired in advance. This makes it possible to use the known area value of each peak P1, P2 to implement machine learning for correctly separating the unseparated peaks, so that it is possible to construct the discriminator 820 capable of determining the optimal separation method in the unseparated peaks.

Note that the technical scope of the present invention is not limited to the above-described embodiment, and includes those acquired by adding various modifications to the above-described embodiment without departing from the spirit of the present invention.

For example, in this specification, the learning data for expanding is not limited to learning data in which the peaks of a spectrum actually measured using the analyzer are superimposed, and may be learning data in which the peaks of a spectrum simulating the spectrum actually measured are superimposed. The simulated spectrum may be, for example, a spectrum simulating the peak broadening (including tailing and leading), the appearance of a shoulder peak, a peak crack, etc., or a spectrum simulating a baseline drift and a noise. The simulated peak can be generated using a known algorithm, such as, e.g., i-PDeA II (manufactured by Shimadzu Corporation).

Further, in the above-described embodiment, two peaks P1 and P2 of the compositions A and B are superimposed to intentionally generate unseparated peaks, but the present invention is not limited thereto. For example, unseparated peaks may be generated by superposing three or more peaks in three or more compositions, which can also be used as learning data. In this case, the area value of each peak can be used as training data. Further, there is a case in which the peak P1, P2 of the composition A, B includes two or more peaks. Even in a case where three or more peaks of three or more of compositions are used, there is a case in which two or more peaks are included for each peak.

Further, in the above-described embodiment, an example is shown in which the waveform data measured by a liquid chromatographic system is used as an object of the machine learning, but the present invention is not limited thereto. For example, a machine learning method according to the present embodiment can also be applied to waveform data acquired by, besides the liquid chromatograph, a gas chromatograph (GC), a gas chromatograph mass spectrometer (GC-MS), a liquid chromatograph mass spectrometer (LC-MS), a photodiode array detector (LC-PDA), a liquid chromatography tandem mass spectrometer (LC/MS/MS), a gas chromatography tandem mass spectrometer (GC/MS/MS), a liquid chromatograph mass spectrometer (LC/MS-IT-TOF), or the like.

DESCRIPTION OF SYMBOLS

1: Data analysis device
2: Computer
80: Model generation unit
810: Learning data generation unit
820: Discriminator
D1, D2, D12: Waveform data
P1, P2: Peak

The invention claimed is:

1. A method of generating a discriminator for detecting one or more peaks in a chromatogram, the method comprising the steps of:
    acquiring a first chromatogram having a first peak, wherein the first chromatogram is acquired by actual measurement of a sample, the sample including a chemical composition from which the first peak is derived;
    acquiring a second chromatogram having a second peak, the second peak being different from the first peak in a peak position, wherein the second chromatogram is acquired by actual measurement or generated using a computer, wherein the second chromatogram is different from the first chromatogram;
    generating unseparated peaks by superimposing, using the computer, the first peak and the second peak so that the first peak and the second peak are overlapped with each other in a time axis direction; and
    performing machine learning by inputting training data including the unseparated peaks as the training data, and the first peak and the second peak as teaching data, directly to the discriminator.

2. The method of generating the discriminator as recited in claim 1,
    wherein at least one of the first chromatogram and the second chromatogram is generated by simulating a chromatogram acquired by actual measurement.

3. The method of generating the discriminator as recited in claim 1,
    wherein in the generating step, at least one of the first chromatogram and the second chromatogram before generating the unseparated peaks is used as the training data to be input to the discriminator.

4. The method of generating the discriminator as recited in claim 3,
    wherein an area value of at least one of the first peak in the first chromatogram and the second peak in the second chromatogram is used.

5. The method of generating the discriminator as recited in claim 1, wherein the first chromatogram is acquired independently in advance by a first actual measurement, and
    wherein the second chromatogram is acquired independently in advance by a second actual measurement different from the first actual measurement.

* * * * *